UNITED STATES PATENT OFFICE.

HARRISON SMITH, OF PHILLIPSBURG, NEW JERSEY.

IMPROVED COMPOSITION FOR STUFFING WOOD.

Specification forming part of Letters Patent No. 70,277, dated October 29, 1867.

*To all whom it may concern:*

Be it known that I, HARRISON SMITH, of Phillipsburg, in the county of Warren and State of New Jersey, have made and invented a new and useful Improvement in the Mode of Treating or Preparing Wood, &c.; and I do hereby declare that the following is a full, clear, and exact description thereof, which will enable those skilled in the art to make and use the same.

The present invention relates to an improved mode of imparting to wood and other materials a smooth surface before the application of the color or colors with which such wood or other material is to be covered or ornamented—as, for example, the bodies of carriages and other vehicles; and this mode consists in applying to the surface of the wood or other material, after having been "primed" in any suitable manner, (as, for instance, by the use of raw linseed-oil, one half pint, with the best white lead, one pound, or by the use of boiled linseed-oil, as heretofore; but I deem it best to use the raw linseed-oil, as it causes the white lead to adhere, and "strikes in" more perfectly,) one or more coats or layers of a mixture composed of the ingredients mixed together in or about the respective proportions below recited, viz: two (2) pounds calcimine-clay; four (4) pounds white lead; four (4) pounds whiting; "japan," so called in trade, liquid in form, in sufficient quantity; and varnish—such, for instance, as is used in the manufacture of furniture—in a quantity one-half, or thereabout, of the amount of japan employed. These ingredients are mixed together by first mixing the clay, lead, and whiting with the spirits of turpentine of a sufficient quantity to bring them to a consistency somewhat less than that of dough or putty, and by then grinding such mixture within a suitable grinding-mill to the finest possible degree, when, by then mixing the japan and varnish therewith, it can be reduced to a sufficiently liquid state for being applied by a brush to the surface desired, in successive layers or coats, two, however, being sufficient for all practical purposes one after the other, but with a sufficient space of time intervening for each of such coats or layers to become "set" or dry, as desired, it being best to scrape off the first after it has been applied, as by such operation it is the more perfectly made or forced to fill the grain or pores of the wood.

By means of the mixture hereinabove specified a surface can be produced upon wood, for which it is more especially intended, of the most perfect smoothness and evenness to receive a coating or layer or layers of coloring material or materials, according as may be desired, and to thus give to such coloring material that elegance of finish and polish so desirable to the bodies of coaches, carriages, and other vehicles.

It may be here observed that in carrying out the improved mode of imparting a smooth surface to wood, &c., embraced in the present invention, it sometimes may be deemed desirable to use a small proportion of red lead, as by such red lead it is caused to set or dry the more quickly; and that, furthermore, before applying the coloring material to the surface produced by the compound upon the wood, &c., such surface may be first rubbed down with pumice-stone, or other suitable material, to relieve it of whatever roughness may have been left by the brush on its application; and that, lastly, in lieu of using white lead, black lead or other coloring medium may be employed in the mixture.

Having thus described my invention, I claim as new and desire to secure by Letters Patent—

The mixture composed of the several ingredients, and mixed together in or about the proportions, substantially as described, and for use substantially as and for the purpose specified.

HARRISON SMITH.

Witnesses:
   LEWIS HINE,
   WILLIAM CAMPBELL.